United States Patent
Seo et al.

(10) Patent No.: US 10,308,150 B2
(45) Date of Patent: Jun. 4, 2019

(54) SEAT PAN AND SEAT

(71) Applicant: BASF SE, Ludwigshafen (DE)

(72) Inventors: HeeWon Seo, Gangnam-gu (KR);
Martin Baumert, Dossenheim (DE);
Tsung-Chieh Cheng, Ludwigshafen (DE); Sangcheol Jun, Incheon (KR);
Daewoo Lee, Incheon (KR); Sunghyun Kang, Incheon (KR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/543,869

(22) PCT Filed: Jan. 14, 2016

(86) PCT No.: PCT/EP2016/050683
§ 371 (c)(1),
(2) Date: Jul. 14, 2017

(87) PCT Pub. No.: WO2016/113359
PCT Pub. Date: Jul. 21, 2016

(65) Prior Publication Data
US 2018/0009352 A1    Jan. 11, 2018

(30) Foreign Application Priority Data

Jan. 16, 2015 (CN) .......................... 2015 1 0024410
Jan. 16, 2015 (CN) ...................... 2015 2 0033480 U (51) Int. Cl.
*B60N 2/68* (2006.01)
*A61G 5/12* (2006.01)
(Continued)

(52) U.S. Cl.
CPC ............... *B60N 2/68* (2013.01); *A47C 7/029* (2018.08); *A61G 5/122* (2016.11); *B60N 2/38* (2013.01);
(Continued)

(58) Field of Classification Search
CPC .......... A47C 7/029; B60N 2/646; B60N 2/38; A61G 5/122
(Continued)

(56) References Cited

U.S. PATENT DOCUMENTS 3,549,201 A * 12/1970 Wolfe ...................... A47C 7/14
297/180.12
4,368,917 A *  1/1983 Urai ........................ A47C 7/16
297/452.15
(Continued)

FOREIGN PATENT DOCUMENTS

CN         202368420 U      8/2012
CN         203410340 U      1/2014
(Continued)

OTHER PUBLICATIONS

International Search Report dated May 3, 2016 in PCT/EP2016/050683 filed Jan. 14, 2016.
(Continued)

*Primary Examiner* — Syed A Islam
(74) *Attorney, Agent, or Firm* — Oblon, McClelland, Maier & Neustadt, L.L.P.

(57) ABSTRACT

The invention discloses a seat pan (20), being formed from a first thermoplastic composite material into a one-piece pan, the seat pan (20) having a weight loading portion (201), wherein at least one slot (2010) is provided in the area of the weight loading portion (201) of the seat pan (20), and covering strips (2012) are formed by overmolding on the side edges of straps (2011) separated by the slot (2010) and extending along at least a portion of the circumference of the slot (2010) so as to reinforce the straps (2011), the covering strips (2012) being made of a second thermoplastic composite material. Furthermore, the invention discloses a seat (1) comprising the above seat pan (20).

21 Claims, 5 Drawing Sheets

(51) Int. Cl.
  *A47C 7/02*      (2006.01)
  *B60N 2/64*      (2006.01)
  *B60N 2/38*      (2006.01)

(52) U.S. Cl.
  CPC ........ *B60N 2/646* (2013.01); *B60N 2002/684* (2013.01); *B60N 2205/30* (2013.01)

(58) Field of Classification Search
  USPC ....................................... 297/452.21–452.28
  See application file for complete search history.

(56) References Cited

U.S. PATENT DOCUMENTS

| | | | | |
|---|---|---|---|---|
| 4,892,356 A | * | 1/1990 | Pittman | ................... A47C 3/12 297/452.15 |
| 6,296,308 B1 | * | 10/2001 | Cosentino | .............. A47C 7/465 297/284.4 |
| 8,919,880 B2 | * | 12/2014 | Bellingar | ................. A47C 7/50 297/284.1 |
| 2012/0061988 A1 | | 3/2012 | Jaranson et al. | |
| 2012/0153702 A1 | | 6/2012 | Kanda et al. | |
| 2013/0313875 A1 | | 11/2013 | Brncick et al. | |

FOREIGN PATENT DOCUMENTS

| | | |
|---|---|---|
| DE | 10 2012 000 772 A1 | 7/2013 |
| EP | 2 272 706 A2 | 1/2011 |
| EP | 2 666 663 A2 | 11/2013 |

OTHER PUBLICATIONS

U.S. Appl. No. 15/543,658, filed Jul. 14, 2017, US 2017/0368973 A1, Hee Won Seo, et al.

* cited by examiner

SEAT PAN AND SEAT

CROSS-REFERENCE TO RELATED APPLICATIONS

This application is a National Stage of PCT/EP2016/050683, which was filed on Jan. 14, 2016. This application is based upon and claims the benefit of priority to Chinese Application No. 201510024410.4, which was filed on Jan. 16, 2015, and to Chinese Application No. 201520033480.1, which was filed on Jan. 16, 2015, the entire contents of both of which are incorporated herein by reference.

TECHNICAL FIELD

The present invention relates to a technical field of automobile parts and more specifically to a vehicle internal trim, seat pan and a seat having the seat pan.

BACKGROUND ART

During development of automobiles, the seat pan frame of a vehicle seat is one of the most important safety parts. Generally, the seat pan frames of commonly used seats at present are formed by welding, integral punching or pressing and casting sheet metals. The seat pan formed by sheet metals exhibit greater strength, but it is very heavy and therefore usable area of the sheet metals will be limited due to the weight limitation, which means that the dimension of the seat pan is limited as well.

Figure 8:
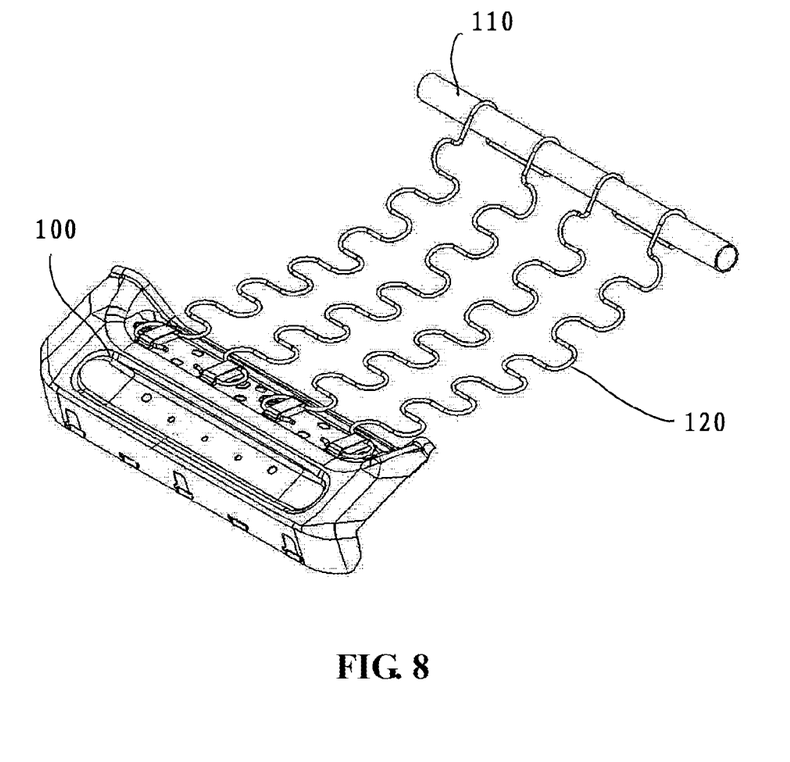
FIG. 8 is a schematic view of the structure of the seat pan of the prior art.

A flexible and light seat pan has been invented to improve comfort, for instance, the seat pan structures disclosed in Chinese utility models CN203410340U and CN202368420U. Referring to FIG. 8, the flexible seat pan includes a front support sheet metal 100, a rear reinforcing tube 110 parallel with the front support sheet metal, and a number of serpentine springs 120 connected therebetween. The front support sheet metal forms a semi-pan of the seat and the serpentine springs are located at the rear half part of the seat pan to provide flexibility to improve seat comfort. However, this seat pan structure suffers from the following drawbacks: additional fastening means for connecting the springs and the front support sheet metal are needed, and the assembling process is very complex; the springs may be deprived of elasticity or susceptible to breakage because the seat pan structure is not capable of resisting continuous impacts caused by tough roads after having been used for a very short period of time, thereby seating comfort being deteriorated and service life being shortened.

Therefore, a seat pan structure needs to be developed which is light and capable of providing sufficient strength for supporting weight of the seat-taker, is simple in manufacture processing, saves assembly time and exhibits perfect seating comfort.

SUMMARY OF THE INVENTION

An objective of the present invention is to provide a seat pan structure which is light and capable of withstanding passenger's weight on seat and absorbing crash energy, is simple in manufacture processing, saves assembly time and improves in terms of seating comfort.

According to an aspect of the invention, a seat pan is provided, which is formed from a first thermoplastic composite material into a one-piece pan, the seat pan having a weight loading portion, wherein at least one slot is provided in the area of the weight loading portion of the seat pan, and covering strips are formed by overmolding onto the side edges of straps separated by the slot and extending along at least a portion of the circumference of the slot so as to reinforce the straps, the covering strips being made of a second thermoplastic composite material. By making use of composite materials, the weight of the seat pan is saved, and by functionally incorporating into the one-piece seat pan straps giving soft behavior, assembly time can be saved while spring effect is added, and through covering strips on the side edges of the straps, it enables to increase the stiffness of the straps and control spring factor of the straps. Meanwhile, the seat pan thus made can function well to withstand the weight of passenger and absorb crash energy.

Preferably, at least one wave-shaped wrinkle comprising a groove and/or protrusion is provided on the straps. Preferably, the groove and/or protrusion extend along the left-and-right direction of the seat pan.

Preferably, the front and rear ends of the weight loading portion of the seat pan are provided with the wave-shaped wrinkles. This is because the front and rear ends of the weight loading portion of the seat pan are susceptible to deform when the seat pan is loaded. Also, by doing so, the endurance of the straps can be enhanced.

Preferably, as compared with the wave-shaped wrinkles in the rear end of the weight loading portion of the seat pan, the wave-shaped wrinkles in the front end of the weight loading portion of the seat pan is formed in higher density. With this configuration, the local deformation of the seat pan is efficiently avoided. Herein, the density means the number of the groove and/or protrusion over the unit length.

Preferably, the at least one slot extends in the front-and-rear direction of the seat pan. Correspondingly, the covering strips extend in the front-and-rear direction of the seat pan. With this configuration, it enables to provide stiffness and softness in a controlled manner, i.e. provide enough strength and seating comfort at the same time.

Preferably, the top surface of the covering strip is flush with the top surface of corresponding strap. Generally, a mat, such as a foam mat, is placed on top of the seat pan. By configuring that the top surface of the covering strip is flush with the top surface of corresponding strap, it allows the covering strips advantageously to control spring factor of the straps. Preferably, the covering strip has an L-shaped cross section.

Preferably, the number of the slots is in the range from 3 to 6. The more the number of the slots is, the more softness the seat pan may provide. However, more weakness points will appear in the seat pan in terms of structural strength. Therefore, through balancing the softness and the strength both, the number of the slots can be optimized.

Preferably, the at least one slot extends to the rear side portion of the seat pan. In design, as long as the structural strength allows, the slots can extend as far as possible to provide more comfort.

Preferably, portions of adjacent straps in the area of the weight loading portion are not in the same plane. The straps in different levels may act as buffering springs and makes it possible to provide more covering strips by making full use of the space the slots provides.

Preferably, among two adjacent straps, the strap in a higher level is provided with wave-shaped wrinkle(s). This is because the straps in higher level receive most part of the load and its impact first when the seat pan is occupied.

Preferably, the covering strips extend along the whole circumference of the slots. With this configuration, the straps are reinforced along the whole circumference of the slots to have enough strength for supporting the weight of the seat-taker.

Preferably, the first thermoplastic composite material may be polyamide reinforced with bidirectional continuous fibers, preferably glass fibers or carbon fibers, in woven form. This material is of low density and high strength, and therefore a preferable choice for the seat pan.

Preferably, the second thermoplastic composite material may be polyamide reinforced with fibers, preferably glass fibers or carbon fibers, the length of the fibers ranging from 0.1 mm to 1.2 mm, preferably 0.2-0.4 mm. Covering strips made of such material can be used to control/adjust the softness the seat pan provides.

Preferably, another covering strip is formed by overmolding the second thermoplastic composite material onto at least a part of the peripheral edge of the seat pan so as to reinforce the seat pan.

According to a second aspect of the invention, a seat is provided, comprising a seat pan mentioned in the above.

With the invention, the seat pan can be made light and strong enough to support the weight of the seat-taker. Moreover, the manufacturing process is easy, with reduced manufacturing cost, decreased assembly time and improved seating comfort.

DETAILED DESCRIPTION OF THE EMBODIMENTS

The following embodiments will be described with reference to the drawings in which examples of the embodiments are shown. The same reference numbers, if possible, are used throughout the drawings to indicate the same or similar components.

Figure 1:
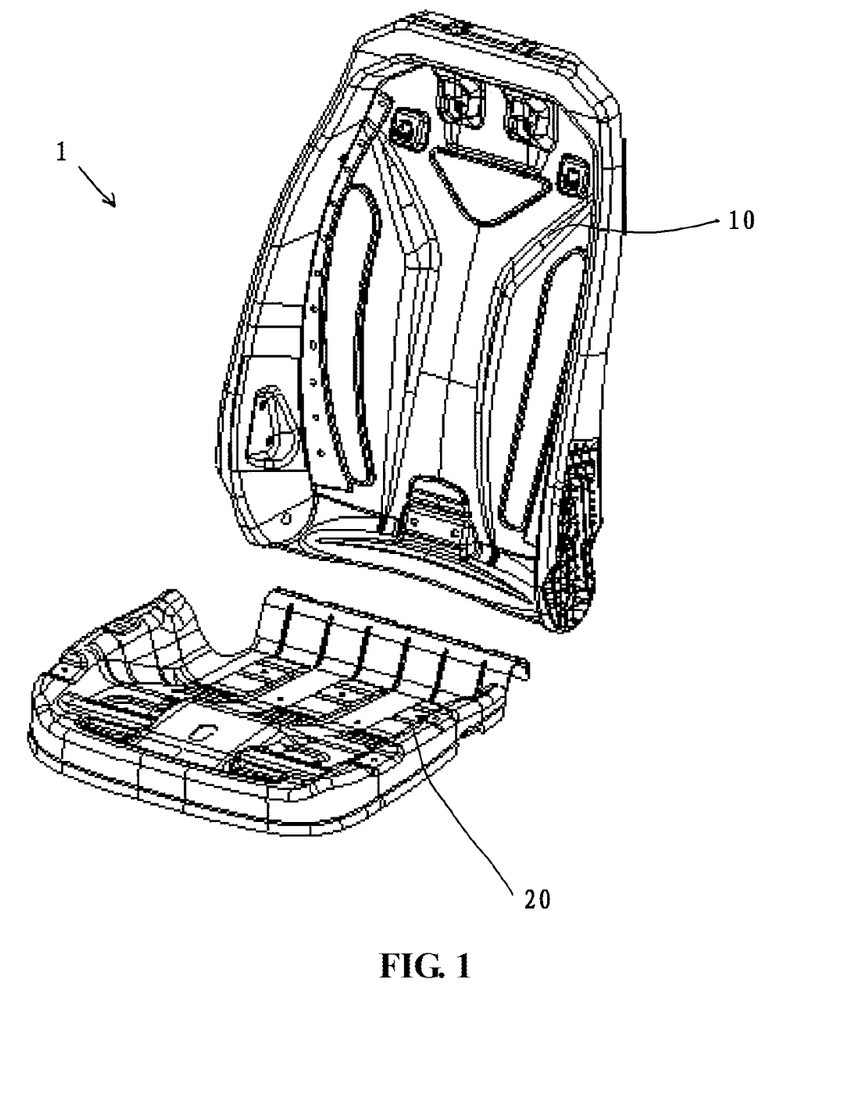
FIG. 1 shows an exploded view of the seat according to the present invention.

FIG. 1 is a general view of a seat 1 of the invention, comprising a backrest 10 and a seat pan 20. Generally, a support structure assembly and a height adjustor assembly are provided beneath the seat pan 20. The support structure assembly mainly comprises a bearing tube at the front with respect to a fore-and-aft direction of the seat, a bearing tube at the rear with respect to a fore-and-aft direction of the seat, and lateral bearing racks at the left and right side with respect to a left-and-right direction of the seat.

Figure 2:
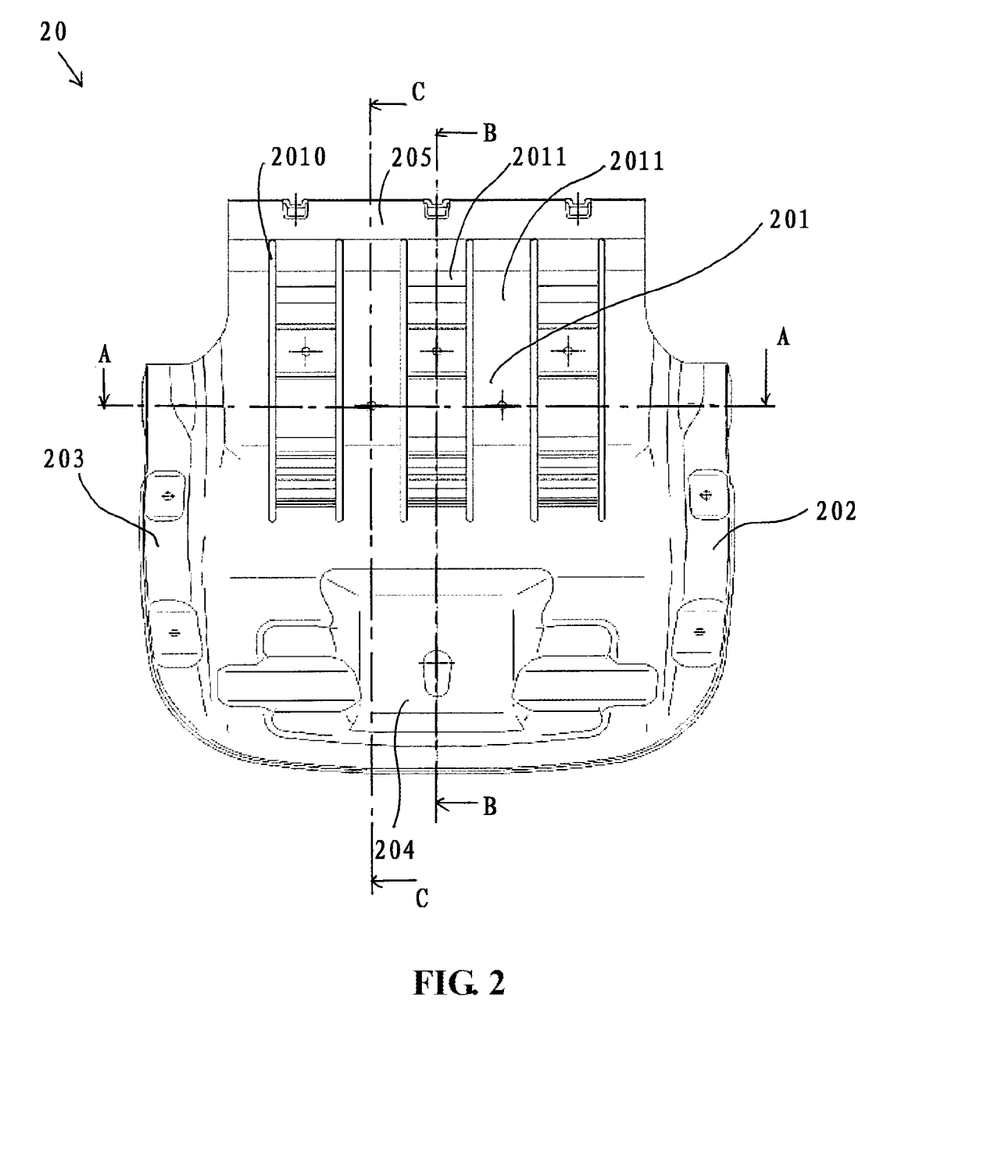
FIG. 2 shows a top view of the seat pan of the seat according to the present invention.

In the embodiment shown in FIG. 2, the seat pan 20 is made of a first thermoplastic composite material, and formed into one piece in a pan shape, for example, by a thermal processing. The seat pan 20 consists of a weight loading portion 201, a left lateral side portion 202, a right lateral side portion 203, a front side portion 204 and a rear side portion 205 divided according to respective functionality. The weight loading portion 201 is configured mainly to support the weight of the seat-taker. The weight loading portion 201 is recessed downwardly from the front side portion 204 and transits backwards into the rear side portion 205. The rear side portion 205 extends upward from the adjoining boundary of the weight loading portion 201 to a level, so that the weight loading portion 201 is substantially located at a bottom area of the seat pan 20.

The composite material for the body of the seat pan exhibits a lower density than a sheet metal, in particular steel and has strength comparable to the sheet metal. Advantageously, the composite material for the body of the seat pan is a thermoplastic material reinforced by bidirectional continuous fibers (such as glass fibers or carbon fibers) in woven form, e.g. Ultralaminate® produced by BASF. Advantageously, the body of the pan may be formed by thermal pressing one layer of thermoplastic materials reinforced by bidirectional continuous fibers mentioned above. Furthermore, it is easy to shape the composite material by thermal processing and the shape molded can be designed flexibly (shape molding can be done in one step without any error). For example, the left lateral side portion 202 area and the right lateral side portion 203 area are preferably provided with a turnup edge for engagement with the left and right lateral bearing racks, and the rear side portion 205 area of the seat pan preferably has a structure (e.g. turnup structure) for cooperation with the rear bearing tube, and the front side portion 204 of the seat pan also preferably has a structure (e.g. turnup structure) for cooperation with the front bearing tube.

The technical terms "front", "rear", "left", "right", "upper" and "lower" herein refer to the fore-and-aft, left-and-right and upper-and-lower direction with respect to the center of the seat or seat pan placed in a posture ready for being seated. In fact, once the seat pan is molded, the posture or position of the seat pan has been determined.

Figure 3:
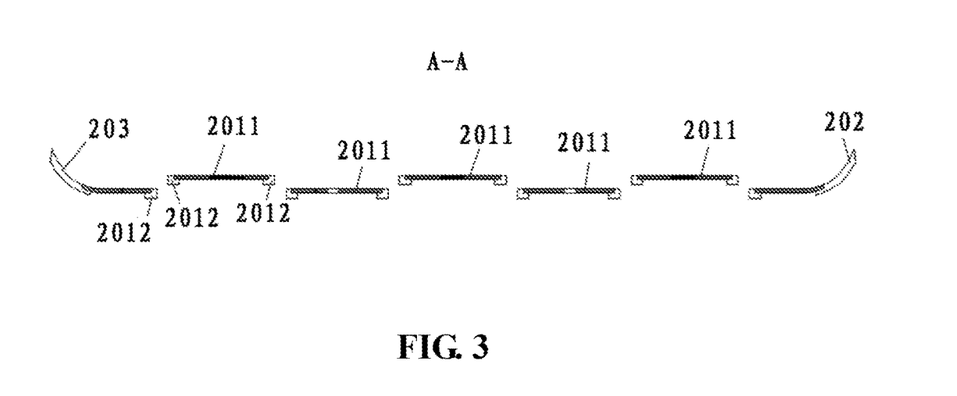
FIG. 3 is a schematic sectional view taken in the A-A direction of FIG. 2 of the seat pan according to the present invention.

In a preferred embodiment shown in FIG. 2 and FIG. 3, the weight loading portion of the seat pan is provided with at least one slot 2010. The slot 2010 is a slot-like opening. Preferably, the slot 2010 extends in a front-and-rear direction of the seat pan 20.

Although FIG. 2 shows six slots 2010, those skilled in the art may easily envisage that the number of the slots 2010 can be three, four, five or more and can be designed as a function of the real width of the seat pan 20 and the strength characteristic of the composite material. In addition, it is shown in the drawings that the slots extend generally parallel with each other, but those skilled in the art may envisage that the extension direction of the slots may not parallel with each other. Furthermore, the slots are not limited to extension in a front-and-rear direction of the seat pan, but also may extend in a left-and-right direction or other directions of the seat pan.

The slots 2010 may extend all the way to the rear side portion 205 area of the seat pan 20 to obtain greater elasticity. Preferably, the slots 2010 does not intersect with the edge of the rear side portion 205.

Figure 6:
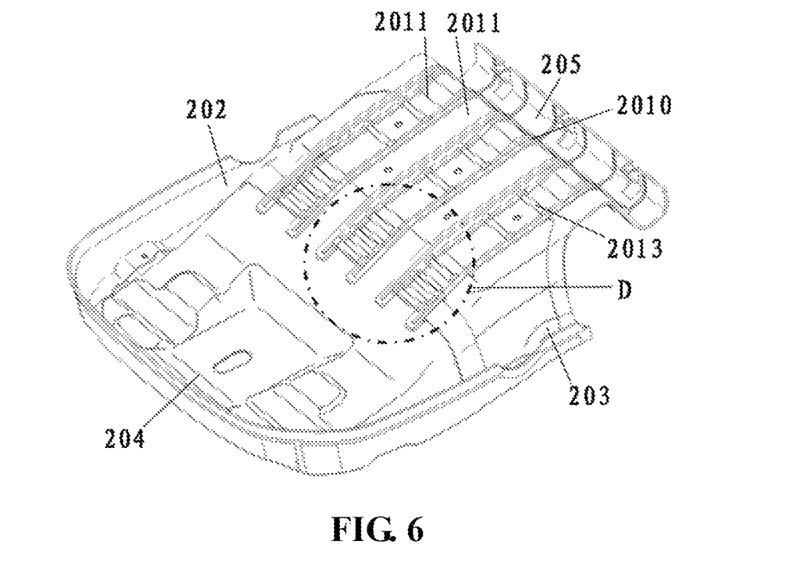
FIG. 6 is a bottom view of the seat pan according to the present invention.

As shown in FIG. 2 and FIG. 3, the slots 2010 divide the weight loading portion 201 in the form of one-piece into a plurality of straps 2011, the ends of which are still jointed. Covering strips 2012 are formed by overmolding onto the side edges of the straps and extending along at least a portion of the circumference of the slots, preferably along the whole circumference of the slots, for example, as shown in FIG. 6.

Preferably, the covering strips 2012 are made of a second thermoplastic composite material. Preferably, the second composite material is different from the first composite material for the body of the seat pan. The second composite material is polyamide and preferably reinforced by no more than 60 mass % of glass or carbon fibers having a length ranging from 0.1 to 1.2 mm, preferably from 0.2 to 0.4 mm, e.g. Ultramid® produced by BASF. The covering strips 2012 are configured to reinforce the straps, enabling to adjust local stiffness and elasticity of corresponding straps 2011. The size, cross sectional shape, number and distribution of the covering strips 2012 can be arranged flexibly according to requirement. Preferably, a top surface of the covering strips 2012 is flush with a top surface of the corresponding strap 2011. The cross sectional shape of the covering strips 2012 may be e.g. L-shaped, triangular shaped or rectangular shaped. The covering strips may also have a cross section which is in any irregular geometrical shape.

In a preferred embodiment, another covering strip is formed by overmolding the second thermoplastic composite material onto at least a part of the peripheral edge of the seat pan so as to reinforce the seat pan as a whole.

Preferably, two adjacent straps are not at the same level in the area of the weight loading portion. For example, the vertical offset between two adjacent straps is 5 mm. As shown in FIG. 3, the straps 2011 are arranged at different levels in the area of the weight loading portion 201 of the seat pan in the left-and-right direction such that some straps in a higher plane receives a pressure first when the seat pan is loaded, then some straps in a lower plane may serve for supporting when they are loaded subsequently. Thus, as a matter of fact, the straps that load weight first have certain cushioning function, thereby providing more satisfactory comfort.

Figure 4:
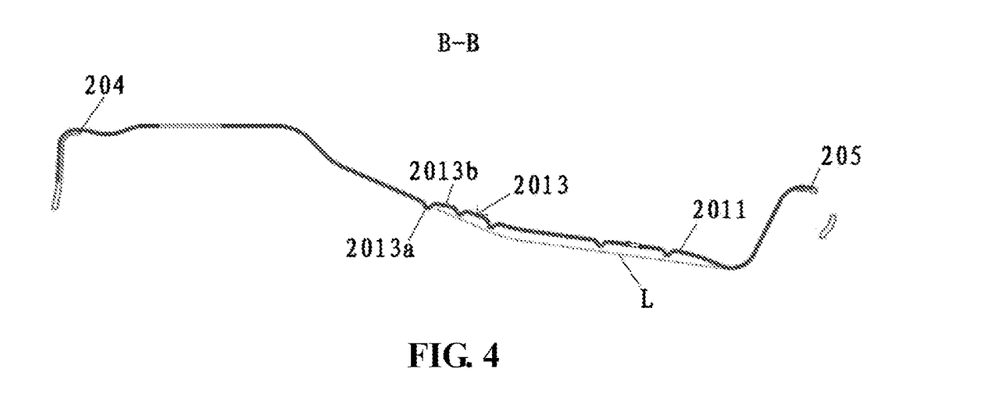
FIG. 4 is a schematic sectional view taken in the B-B direction of FIG. 2 of the seat pan according to the present invention.
Figure 5:
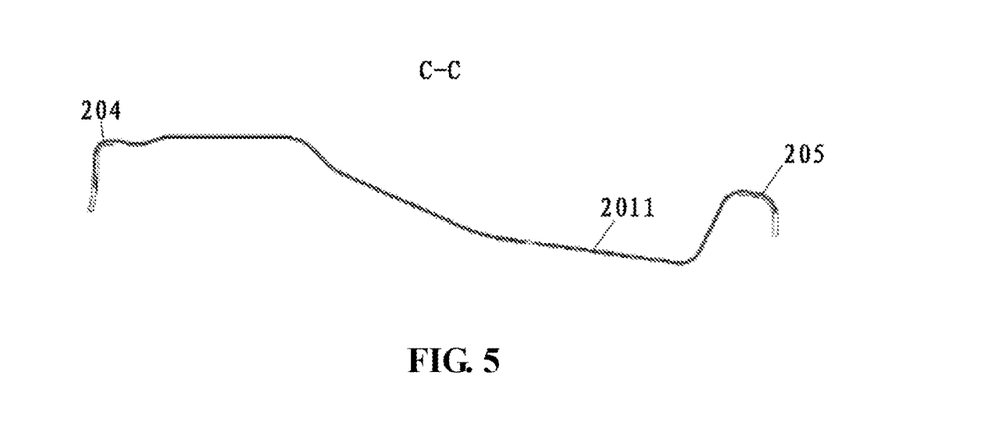
FIG. 5 is a schematic sectional view taken in the C-C direction of FIG. 2 of the seat pan according to the present invention.

As can be seen from the seat pan shown in FIGS. 4 and 5, the weight loading portion 201 of the seat pan 20 is recessed downward and rearward relative to the front side portion, which is primarily intended for meeting the requirement on comfort of a seat-taker seating on the seat pan in terms of human engineering. Especially from FIG. 4, it can be seen that the strap in an upper level is configured to deviate from the base line L extending in the form of an arc smoothly connecting two ends of the strap. When the seat pan is loaded, the strap in upper level will be forced into deform and come close to the base line L in profile and the straps in lower level will be tensioned and stretched, and when the seat pan is unloaded, all the straps will come back to its normal position. The straps therefore act as a spring.

Figure 7:
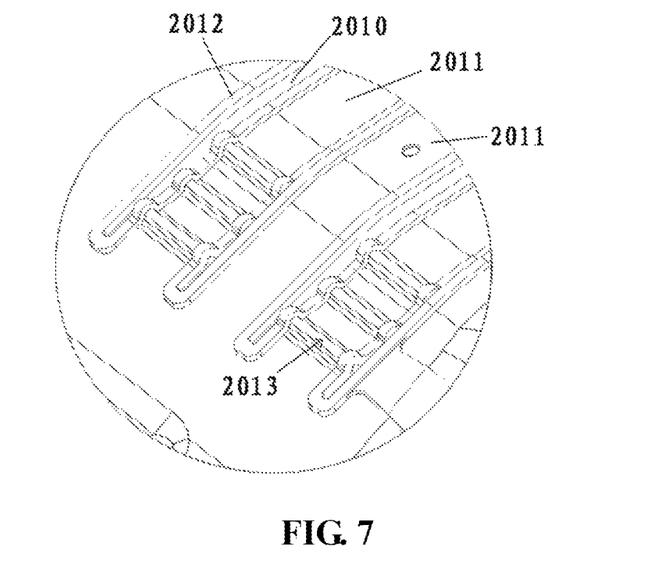
FIG. 7 is an enlarged view of the portion D of the seat pan marked in FIG. 6.

In a preferable embodiment shown in FIGS. 4, 6 and 7, some straps 2011 are provided with a wave-shaped wrinkle 2013 including a groove 2013*a* and/or a protrusion 2013*b*. Preferably, the groove 2013*a* and/or the protrusion 2013*b* extend in a left-and-right direction of the seat pan. Preferably, the groove 2013*a* and/or the protrusion 2013*b* extend over the entire width of the corresponding strap. The wave-shaped wrinkle 2013 may increase the strength of the straps 2011 to prevent local deformation thereof, especially when the straps are loaded. Preferably, the wave-shaped wrinkles 2013 are distributed over a front end and a rear end of the weight loading portion 201 area of the seat pan 20. In a preferable embodiment, compared with wave-shaped wrinkles disposed at the rear end area of the weight loading portion of the seat pan, the front end area of the weight loading portion 201 of the seat pan 20 is provided with the wave-shaped wrinkles in higher density.

In the preferred embodiments shown in FIGS. 3, 4 and 5, only one of two adjacent straps 2011 is provided with wave-shaped wrinkle(s). Specifically, among two adjacent straps, the strap in an upper level has at least one wave-shaped wrinkle.

INDUSTRIAL APPLICABILITY

The following is a description of the manufacturing process of the seat pan of the invention.

A composite material comprising a polymer reinforced with continuous (i.e. long) fiber (for example, the Ultralaminate® material from the BASF) is provided in proper size and shape for forming the main body of the seat pan. Generally, the composite material provided is formed by thermal processing (in-mold forming) into the one-piece body of the seat pan in a pan shape, simultaneously forming the profile or configuration of the weight loading portion 201, left side lateral portion 202, right side lateral portion 203, front side portion 204 and the rear side portion 205(for example, the turnup structure in the areas of the left lateral side portion 202 and the right lateral side portion 203, the concave-convex reinforcing structure in the area of the front side portion 204, and the wave-shaped wrinkle in the area of the weight loading portion 201). Slots 2010 of proper length and width are formed by cutting at the predetermined position in the areas of the weight loading portion 201 and the rear side portion 205, for example, through punching and shearing. The slots in the area of the weight loading portion 201 of the seat pan provides softness in proper degree, higher seating comfort, and better effect of absorbing crash energy. The wave-shaped wrinkle on the straps obtained by the forming of the slots provides local reinforcement in structure, preventing the straps from deforming locally.

Then, the covering strips 2012 made of polymer material reinforced with discontinuous (i.e. short) fiber (for example, the Ultramid® material from BASF) are formed by overmolding on the side edges of the straps 2011 separated by the slots. The weight loading portion of the seat pan thus formed has stiffness and elasticity that vary with the material, size, cross sectional shape and distribution of the covering strips. Thus, the local stiffness and elasticity of the seat pan can be adjusted by the designed structure of the covering strips, so that different stiffness and elasticity may be designed flexibly according to application of the seat pan.

According to the invention, due to lower density of the composite material, the size of the seat pan can be designed according to requirement, without any limitation in terms of weight, which means it makes possible to increase the size of the seat pan as needed. In addition, because of simple molding process, it is possible to dispense with additional assembling steps, to save time and to reduce the manufacturing cost.

The above depiction is only preferred embodiments of the present invention and is not taken as limiting or restricting this invention since various modifications and improvements may be made through the exercise of those skilled in the art without departing from the scope of the present invention. Any modifications, equivalents or improvements made within the spirit and principle of this invention are encompassed within the protection scope of the present invention. Other embodiments may be obtained on the basis of disclosure in the description. The description and embodiments shall be considered exemplary only and the true scope of the invention is defined by the annexed claims and equivalents thereof.

LIST OF REFERENCE NUMBERS 1 seat
10 backrest
20 seat pan
201 weight loading portion
2010 slot
2011 strap
2012 covering strip
2013 wave-shaped wrinkle
2013a groove
2013b protrusion
202 left lateral side portion
203 right lateral side portion
204 front side portion
205 rear side portion

What is claimed:

1. A seat pan being formed from a first thermoplastic composite material into a one-piece pan, the seat pan having a weight loading portion, wherein at least one slot is provided in the area of the weight loading portion of the seat pan, and covering strips are formed by overmolding onto the side edges of straps separated by the slot and extending along at least a portion of the circumference of the slot so as to reinforce the straps, the covering strips being made of a second thermoplastic composite material.

2. The seat pan according to claim 1, wherein at least one wave-shaped wrinkle comprising at least one of a groove and a protrusion is provided on the straps.

3. The seat pan according to claim 2, wherein the at least one of the groove and the protrusion extend along the left-and-right direction of the seat pan.

4. The seat pan according to claim 2, wherein the front and rear ends of the weight loading portion of the seat pan are provided with the wave-shaped wrinkles.

5. The seat pan according to claim 4, wherein as compared with the wave-shaped wrinkles in the rear end of the weight loading portion of the seat pan, the wave-shaped wrinkles in the front end of the weight loading portion of the seat pan is formed in higher density.

6. The seat pan according to claim 1, wherein the at least one slot extends in the front-and-rear direction of the seat pan.

7. The seat pan according to claim 1, wherein the top surface of the covering strip is flush with the top surface of corresponding strap.

8. The seat pan according to claim 1, wherein the covering strip has an L-shaped cross section.

9. The seat pan according to claim 1, wherein the number of the slots is 3 to 6.

10. The seat pan according to claim 1, wherein the at least one slot extends to the rear side portion of the seat pan.

11. The seat pan according to claim 2, wherein portions of adjacent straps in the area of the weight loading portion are not in the same plane.

12. The seat pan according to claim 11, wherein among two adjacent straps, the strap in a higher level is provided with wave-shaped wrinkle(s).

13. The seat pan according to claim 1, wherein portions of adjacent straps in the area of the weight loading portion are not in the same plane.

14. The seat pan according to claim 1, wherein the covering strips extend along the whole circumference of the slots.

15. The seat pan according to claim 1, wherein the first thermoplastic composite material is polyamide reinforced with bidirectional continuous fibers in woven form.

16. The seat pan according to claim 15, wherein the continuous fibers are glass fibers or carbon fibers.

17. The seat pan according to claim 1, wherein the second thermoplastic composite material is polyamide reinforced with fibers.

18. The seat pan according to claim 17, wherein the fibers are glass or carbon fibers with a length ranging from 0.1 to 1.2 mm.

19. The seat pan according to claim 18, wherein the glass or carbon fibers have a length ranging from 0.2 to 0.4 mm.

20. The seat pan according to claim 1, wherein another covering strip is formed by overmolding the second thermoplastic composite material onto at least a part of the peripheral edge of the seat pan so as to reinforce the seat pan.

21. A seat, comprising a seat pan according to claim 1.

* * * * *

UNITED STATES PATENT AND TRADEMARK OFFICE
CERTIFICATE OF CORRECTION

PATENT NO. : 10,308,150 B2  
APPLICATION NO. : 15/543869  
DATED : June 4, 2019  
INVENTOR(S) : Hee Won Seo et al.

Page 1 of 1

It is certified that error appears in the above-identified patent and that said Letters Patent is hereby corrected as shown below:

In the Specification

In Column 3, Line 27, "DESCRIPTON" should read –DESCRIPTION–

In Column 4, Line 42, "FIG.3" should read –FIG. 3–

In the Claims

In Column 7, Line 24, Claim 1, "portion ," should read –portion,–

Signed and Sealed this  
Twenty-ninth Day of October, 2019

Andrei Iancu  
*Director of the United States Patent and Trademark Office*